United States Patent [19]

Takehara

[11] Patent Number: 5,187,718

[45] Date of Patent: Feb. 16, 1993

[54] DEMODULATOR FOR SPREAD SPECTRUM COMMUNICATION

[75] Inventor: Kazuyuki Takehara, Okazaki, Japan

[73] Assignee: Maruyasu Industries Co., Ltd., Nagoya, Japan

[21] Appl. No.: 709,895

[22] Filed: Jun. 4, 1991

[51] Int. Cl.$^5$ .................... H04L 27/30; H01L 41/04; H01L 41/08

[52] U.S. Cl. ......................... 375/1; 380/34; 375/96; 310/313 B; 333/193

[58] Field of Search ...................... 364/821, 1; 380/34; 310/313 R, 313 B; 333/193; 375/96, 1

[56] References Cited

U.S. PATENT DOCUMENTS

| | | | |
|---|---|---|---|
| 3,736,587 | 5/1973 | Bush et al. | 380/34 |
| 4,247,903 | 1/1981 | Grudkowski et al. | 364/821 |
| 4,675,839 | 6/1987 | Kerr | 364/821 |
| 4,969,159 | 11/1990 | Belcher et al. | 375/1 |
| 4,998,261 | 3/1991 | Van Driest et al. | 375/1 |

FOREIGN PATENT DOCUMENTS 1-214294 8/1989 Japan.
0077445 4/1991 Japan.

Primary Examiner—Bernarr E. Gregory
Attorney, Agent, or Firm—Foley & Lardner

[57] ABSTRACT

A demodulator for a spread spectrum communication system, including a piezoelectric substrate for causing elastic surface waves, an input electrode provided on the surface of the piezoelectric substrate, an intermediate electrode provided on the piezoelectric substrate surface a predetermined distance away from the input electrode, so as to form a matched filter together with the input electrode, and an output electrode provided on the piezoelectric substrate surface at a predetermined distance away from the intermediate electrode, so as to form a delay path together with the intermediate electrode.

1 Claim, 2 Drawing Sheets

DEMODULATOR FOR SPREAD SPECTRUM COMMUNICATION

BACKGROUND OF THE INVENTION

This invention relates to a demodulator for spread spectrum communication, comprising a matched filter including a surface acoustic wave device and a delay element.

A spread spectrum communication system which has less noise and superior secrecy has recently been watched with keen interest and development of transmitters and receivers for the spread spectrum communication have been launched. In the spread spectrum communication system, generally, a spread spectrum (SS) signal to be transmitted covers a very widely spread frequency band. More specifically, a carrier wave with narrow frequency band obtained by modulating information to be transmitted by a base band signal is further modulated by a series of codes with a predetermined high bit rate, thereby obtaining the spread spectrum signal with the frequency band. A pseudo random noise code series or a Gold code series is employed as the above-mentioned series of codes. Various systems have been proposed for the spread spectrum modulation, including a direct sequence method and a frequency hopping method.

The receiver is provided with a demodulator for demodulating the spread spectrum signals obtained by modulating the carrier waves with a series of the pseudo random noise codes in the direct sequence method, for example. The demodulator is arranged to derive the spread spectrum signal as an information bit signal when the spread spectrum signal received accords with a pattern of the pseudo random noise code series which is the same as that employed in modulating the information at the transmitter. In this case, since there is no interrelation between different pseudo random noise codes, the received signal is multiplied by the pseudo random noise code the same as that in the modulation, so that only the interrelating components of the transmitted signals can be delivered.

Since the spread spectrum signal modulated with the series of the predetermined codes has a very wide frequency band as compared with the frequencies used in conventional communication systems, the spread spectrum signal is less influenced by noise. Further, since the spread spectrum signal has a low power spectrum density and a better signal secrecy, it has advantage of being less likely to be intercepted. Additionally, since the spread spectrum modulation and demodulation are executed with the series of predetermined codes such as a series of pseudo random noise codes, frequency allocation is not necessitated for the purpose of preventing radio interference, as employed in the conventional communication system. Thus, the problem of shortage in the allocated frequency range with increase in the number of communication stations can be solved by spread spectrum communication.

Communication devices employing the above-described spread spectrum system have been exclusively produced for military use, because of its complicated arrangements and high costs. However, spread spectrum communication devices have recently been watched with a keen business interest, since a demodulator having a matched filter comprising a surface acoustic wave device has been found to be produced in a relatively simple arrangement. The usability of the spread spectrum communication has recently been reconsidered with an increased demand for consumer communication with weak radio waves in factories or offices. FIG. 2 schematically illustrates a direct sequence method type demodulator having a matched filter comprising a surface acoustic wave device.

Referring to FIG. 2, a matched filter 1 composed of a surface acoustic wave device has an input electrode 3 and an output electrode 4 formed on a piezoelectric substrate 2 with a predetermined distance between them. The input electrode 3 has an interdigital pattern corresponding to the pseudo random noise codes employed for the spread spectrum modulation. For example, when the series of pseudo random noise codes is a series of n-bit pulses, the interdigital pattern of the input electrode 3 is formed so as to correspond to the n-bit pattern. Consequently, when the spread spectrum signal is supplied to the input electrode 3, the signal is transferred as surface acoustic waves through the surface portion 2a of the piezoelectric substrate 2. The magnitude of the surface acoustic waves is increased when the coded pattern of the spread spectrum signal corresponds to the pattern of the input electrode 3. More specifically, the spread spectrum signal is picked up at the output terminal 4 as an information signal every time the spread spectrum signal is matched with the pattern of the input electrode 3. Thus, the information signals are periodically delivered. An amplifier 5 has an input electrode connected to the output electrode 4 of the matched filter 1. The periodical information signals appearing at the output electrode 4 are amplified by the amplifier 5 to be delivered. A delay path 6 comprising a surface acoustic wave device has interdigital input and output electrodes 8 and 9 formed on an piezoelectric substrate with a predetermined distance between them. When an electrical signal is supplied to the input electrode 8, it is transferred to the output electrode 9 through a surface portion 7a of the piezoelectric substrate 7 as the surface acoustic wave having the propagation velocity slower than that of the electrical signal. In this case the delay path 6 is so set that a delay signal delayed by one cycle relative to each information signal periodically supplied from the matched filter 1 is obtained. A product of the outputs of the matched filter 1 and the delay path 6 is obtained by a product circuit 10, thereby demodulating the spread spectrum signal into the carrier wave to be delivered.

In accordance with the above-described arrangement, when the spread spectrum signal modulated in the direct sequence system, the spread spectrum signal is transmitted, as a large surface acoustic wave, to the output electrode 4 through the piezoelectric substrate surface 2a every time the pattern of the series of codes corresponds to the pattern of the interdigital input electrode 3. The output from the output electrode 4 is supplied to the amplifier 5 as the information signal and also to the product circuit 10. On the other hand, the information signal supplied to the delay path 6 from the matched filter 1 through the amplifier 5 is delivered to the product circuit 10 as a delay signal with a delay of one cycle. Consequently, the information signal from the matched filter 1 is detected in the product circuit 10 in synchronism with the delay signal from the delay path 6 such that the information signal is demodulated to the usual carrier wave output.

Generally, the surface acoustic wave device has a disadvantage that the insertion loss is large or the conversion efficiency of the electrical signal to the surface acoustic wave signal is low. Accordingly, the amplifier 5 is necessitated when the information signal is input from the matched filter 1 to the delay path 6. Such a large insertion loss also reduces the S/N ratio. Further, installation of the matched filter 1 and the delay path 6 each as the surface acoustic wave device and the amplifier 5 prevents the demodulator device from being rendered small-sized.

SUMMARY OF THE INVENTION

Therefore, an object of the present invention is to provide a demodulator for the spread spectrum communication wherein the amplifier need not be provided in the arrangement comprising the matched filter and the delay path each as the surface acoustic wave device, resulting in simplification and miniaturization of the demodulator. The present invention provides a demodulator for spread spectrum communication comprising a piezoelectric substrate having two ends and a surface along which a surface acoustic wave is propagated when a voltage is applied to the piezoelectric substrate. An input electrode is formed as an interdigital pattern corresponding to a predetermined number of bits and disposed at one end of the piezoelectric substrate on the surface thereof so that a matched filter is formed. An intermediate electrode is provided for deriving the surface acoustic wave picked up by the matched filter as an electrical signal. The intermediate electrode is formed on the surface of the piezoelectric substrate so as to be spaced from the input electrode in a direction of the other end of the piezoelectric substrate. An output electrode is provided for obtaining an electrical signal delayed for a predetermined period of time relative to the electrical signal generated by the intermediate electrode. The output electrode is formed on the surface of the piezoelectric substrate so as to be spaced from the intermediate electrode in the direction of the piezoelectric electrode by a distance corresponding to a time length of a waveform of a signal matched by the matched filter or one over an integer of the time length.

In accordance with the above-described demodulator, the output signal from the intermediate electrode of the matched filter is directly supplied to the delay path as the surface acoustic wave. Accordingly, differing from the prior art arrangement in which the output signal from the matched filter needs to be converted to an electrical signal to be supplied to the delay path, there is no loss of signal between the matched filter intermediate electrode and the delay path. Consequently, the amplifier need not be provided and the S/N ratio can be improved.

Other objects of the invention will become obvious upon understanding of the illustrative embodiment about to be described. Various advantages not referred to herein will occur to one skilled in the art upon employment of the invention in practice.

BRIEF DESCRIPTION OF THE DRAWINGS

For a better understanding of the invention, reference may be had to the following description taken in conjunction with the accompanying drawings, in which.

DESCRIPTION OF THE PREFERRED EMBODIMENT

Figure 1:
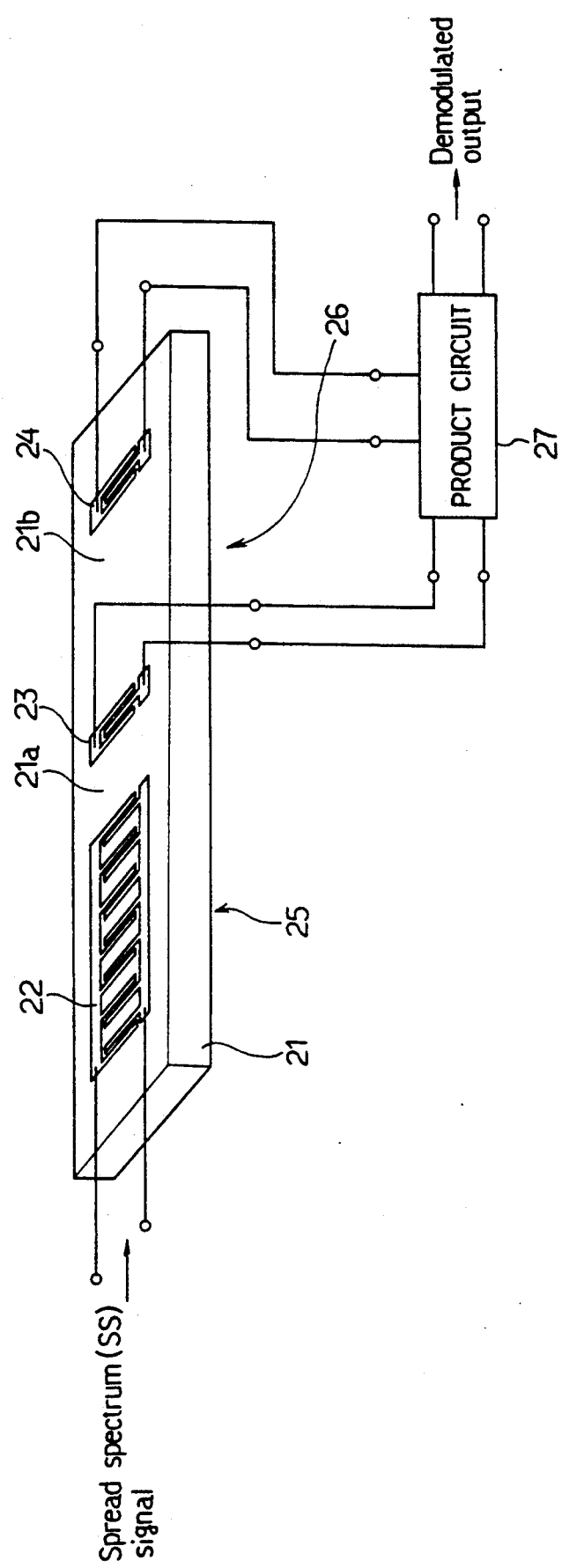
FIG. 1 is a schematic view of an electrical arrangement of the demodulator in accordance with an embodiment.
Figure 2:
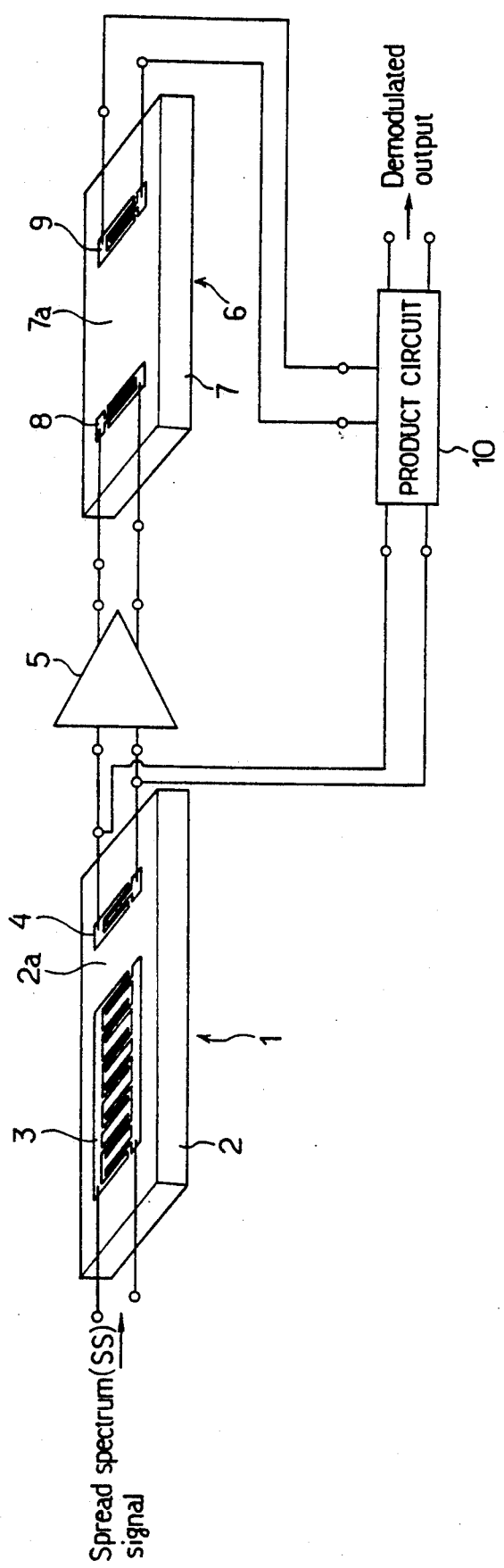
FIG. 2 is a view illustrating a prior art arrangement.

An embodiment of the present invention will now be described with reference to FIG. 1. A piezoelectric substrate 21 is formed of a monocrystal material, such as crystal or another monocrystal material such as lithium niobate (LiNbO$_3$) or lithium tantalate (LiTaO$_3$). Further, the piezoelectric substrate 21 may comprise a zinc oxide (ZnO) film adhered on the surface of a glass plate or piezoelectric ceramic. An interdigital input electrode 22, an interdigital intermediate electrode 23 and an interdigital output electrode 24 are formed on the upper face of the piezoelectric substrate 21 with predetermined distances between the input and intermediate electrodes and between the output and intermediate electrodes, as will be explained. The input electrode 22 is arranged so that an interdigital pattern corresponds to a bit pattern of a series of pseudo random noise codes at the time carrier waves are modulated into spread spectrum signals. A matched filter 25 is composed of the piezoelectric substrate 21 and the input and intermediate electrodes 22, 23. The distance between the intermediate and output electrodes 23, 24 is set to such a value that a surface acoustic wave takes a period of time corresponding to one cycle of information signals periodically generated from the matched filter 25 to be transferred from the intermediate electrode 23 to the output electrode 24 or corresponding to a time length of a waveform of a signal matched by the matched filter 25. A delay path 26 is composed of the intermediate and output electrodes 23, 24 and the portion of the substrate 21 between them. Thus, the matched filter 25 and delay path 26 are formed in the single piezoelectric substrate 21 in a monolithic form. A product circuit 27 has an input terminal connected to the intermediate and the output electrodes 23, 24, so that the product of input signals from both electrodes is obtained.

Operation of the demodulator will now be described. When the spread spectrum signal is supplied to the input electrode 22, it is converted to the surface acoustic wave, which wave is transferred to intermediate electrode 23. In this case the surface acoustic wave with a high output is transferred to the intermediate electrode 23 through a surface portion 21a of the piezoelectric substrate 21 every time the coded pattern of the spread spectrum signal periodically corresponds to the interdigital pattern of the input electrode 22. More specifically, when the interdigital pattern of the input electrode 22 is matched with the pseudo random noise code pattern at the time the analog signal is modulated to the spread spectrum signal, the spread spectrum signal is picked up by the intermediate electrode 23 as the information signal or an electrical signal and further to the product circuit 27. Moreover, the surface acoustic wave as the information signal is transferred from the intermediate electrode 23 to the output electrode 24 through a surface portion 21b of the substrate 21. The information signal supplied to the output electrode 24 is delayed by one cycle while passing through the delay path 26. The information signal is thus supplied, as a delay signal, from the output electrode 24 to the product circuit 27. Consequently, the information signal from the matched filter 25 is synchronized with the delay signal from the delay path 26 in the product circuit 27. The product of the information signal and the delay signal is obtained by the product circuit 27, thereby demodulating to the carrier wave output. In this case, since the information signal appearing at the intermediate electrode 23 is directly transferred to the output electrode 24 through the substrate 21 without being converted to an electrical signal, the conversion loss of the signal output does not occur and a sufficient signal output can be achieved without employment of an amplifier. Alternatively, the length of the delay path 26 may correspond to one over an integer of the time length of the waveform of the signal matched by the matching filter.

As obvious from the foregoing, the matched filter 25 and the delay path 26 are formed in the piezoelectric substrate 21 in the monolithic form, so that the surface acoustic wave can be directly supplied from the matched filter 25 to the delay path 26. Consequently, the amplifier employed in the conventional arrangement need not be provided in the demodulator of the present invention and the S/N ratio can be improved. Further, since the arrangement can be simplified, the spread spectrum communication demodulator can be rendered small-sized and produced at low cost.

Although the surface acoustic wave is delayed by causing it to pass through the delay path 26 in the foregoing embodiment, it may insisted be reflected for the purpose of providing the delay period of time.

The foregoing disclosure and drawings are merely illustrative of the principles of the present invention and are not to be interpreted in a limiting sense. The only limitation is to be determined from the scope of the appended claim.

I claim:
1. A demodulator for a spread spectrum communication system, comprising:
    a piezoelectric substrate having two ends and a surface along which a surface acoustic wave is propagated when a voltage is applied to one end of the piezoelectric substrate;
    an input electrode formed in an interdigital pattern corresponding to a predetermined number of bits and disposed at said one end of the piezoelectric substrate on a surface thereof, so that a matched filter is formed;
    an intermediate electrode for deriving the surface acoustic wave picked up by the matched filter as an electrical signal, the intermediate electrode being formed on said surface of the piezoelectric substrate and spaced from the input electrode in the direction toward the other end of the piezoelectric substrate; and
    an output electrode for obtaining an electrical signal delayed for a predetermined period of time relative to the electrical signal generated by the intermediate electrode, the output electrode being formed on said surface of the piezoelectric substrate and spaced from the intermediate electrode in the direction of the other end of the piezoelectric electrode by a distance corresponding to a time length of a waveform of a signal matched by the matched filter or one over an integer of the time length.

* * * * *